(12) United States Patent
Brossard et al.

(10) Patent No.: US 12,242,475 B2
(45) Date of Patent: Mar. 4, 2025

(54) AUTOSCALING EXTERNAL FUNCTION REQUESTS

(71) Applicant: Snowflake Inc., Bozeman, MT (US)

(72) Inventors: Elliott Brossard, Kirkland, WA (US); Istvan Cseri, Seattle, WA (US); Isaac Kunen, Seattle, WA (US); Nitya Kumar Sharma, Bellevue, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 8 days.

(21) Appl. No.: 17/039,473

(22) Filed: Sep. 30, 2020

(65) Prior Publication Data
US 2022/0100758 A1    Mar. 31, 2022

(51) Int. Cl.
*G06F 16/2453*    (2019.01)

(52) U.S. Cl.
CPC .. *G06F 16/24532* (2019.01); *G06F 16/24542* (2019.01)

(58) Field of Classification Search
CPC ............... G06F 16/24532; G06F 16/24542
See application file for complete search history.

(56) References Cited

U.S. PATENT DOCUMENTS

| | | | |
|---|---|---|---|
| 7,574,424 B2 | 8/2009 | Chowdhuri | |
| 2015/0261765 A1 | 9/2015 | Weyerhaeuser et al. | |
| 2017/0116043 A1* | 4/2017 | Muthulingam | G06F 9/5083 |
| 2018/0024863 A1* | 1/2018 | Jagadeesh | G06F 9/5011 709/226 |
| 2018/0052887 A1* | 2/2018 | Soncodi | G06F 9/5005 |
| 2018/0060399 A1* | 3/2018 | Lee | G06F 16/24532 |
| 2018/0089262 A1* | 3/2018 | Bhattacharjee | G06F 16/24535 |
| 2018/0165331 A1* | 6/2018 | Zhang | G06F 16/2255 |
| 2018/0173753 A1 | 6/2018 | Pei et al. | |
| 2018/0373567 A1* | 12/2018 | Finlay | G06F 9/5061 |
| 2019/0079972 A1* | 3/2019 | Lee | G06F 9/4881 |

(Continued)

FOREIGN PATENT DOCUMENTS

| | | |
|---|---|---|
| CN | 116348864 A | 6/2023 |
| WO | WO-2022072024 A1 | 4/2022 |

OTHER PUBLICATIONS

"International Application Serial No. PCT/US2021/039768, International Search Report mailed Jul. 29, 2021", 3 pgs.

(Continued)

*Primary Examiner* — Ann J Lo
*Assistant Examiner* — Fernando M Mari Valcarcel
(74) *Attorney, Agent, or Firm* — Schwegman Lundberg & Woessner, P.A.

(57) ABSTRACT

External functions can provide users of a database system the ability to invoke external services while operating from inside the database system. The techniques described herein address may detect throttling by the external system and automatically adjust or modify a request rate accordingly. Also, the techniques described herein may increase the request rate to optimize the use of the resources provided by the external system. These techniques allow the database system to improve efficiency when working with external services, which may or may not be elastic or scalable. Moreover, these techniques can decrease query execution times and reduce costs.

27 Claims, 9 Drawing Sheets

(56) References Cited

U.S. PATENT DOCUMENTS

| | | | |
|---|---|---|---|
| 2019/0147085 A1* | 5/2019 | Pal | G06F 16/24542 707/718 |
| 2019/0258632 A1* | 8/2019 | Pal | G06F 16/2465 |
| 2020/0272526 A1* | 8/2020 | Bhole | G06F 11/3409 |
| 2020/0287920 A1* | 9/2020 | Mandrychenko | H04L 67/2828 |
| 2020/0293372 A1* | 9/2020 | Haprian | G06F 11/3006 |
| 2020/0301943 A1* | 9/2020 | Robinson | G06F 16/5846 |
| 2021/0357263 A1* | 11/2021 | Cruanes | G06F 9/5077 |

OTHER PUBLICATIONS

"International Application Serial No. PCT/US2021/039768, Written Opinion mailed Jul. 29, 2021", 9 pgs.

"International Application Serial No. PCT/US2021/039768, International Preliminary Report on Patentability mailed Apr. 13, 2023", 11 pgs.

"European Application Serial No. 21876156.7, Response to Communication pursuant to Rules 161(1) and 162 EPC filed Nov. 10, 2023", 11 pgs.

"European Application Serial No. 21876156.7, Extended European Search Report mailed Aug. 6, 2024", 9 pgs.

\* cited by examiner

AUTOSCALING EXTERNAL FUNCTION REQUESTS

TECHNICAL FIELD

The present disclosure generally relates to a network-based database system and, more specifically, to autoscaling external functions from a network-based database system.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database platform could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

In some instances, a user of the network-based data warehouse may wish to make use of functionality that is external to the data warehouse system to analyze or otherwise process data stored by the data warehouse. Moreover, the configurations of such an external system may be unknown to the data warehouse. For example, on the one hand, the data warehouse may be elastic and scalable; on the other hand, the capabilities and capacity of the external system may be unknown to the data warehouse.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

External functions can provide users of a database system (e.g., a data warehouse system) the ability to invoke external services while operating from inside the database system. The external services may be provided by a remote external system. While the database system may be scalable and elastic, (e.g., it can scale up or down its processing rate based on the availability of computing resources), the external system may not be scalable or elastic. Moreover, the capabilities or capacity of the external system may not be known by the data warehouse system. The database system may not know if the external system can handle the current load of external call requests from the database system or if it can handle even more than the current load. For example, a high rate of requests may destabilize the external system, causing it to crash. Thus, the techniques described herein address this problem by detecting throttling by the external system and automatically adjusting or modifying the request rate and concurrency at runtime accordingly. Also, the techniques described herein may increase the request rate to fully optimize use of the resources provided by the external system. These techniques allow the database system to improve efficiency when working with external services. Moreover, these techniques can decrease query execution times, thereby reducing costs.

Figure 1:
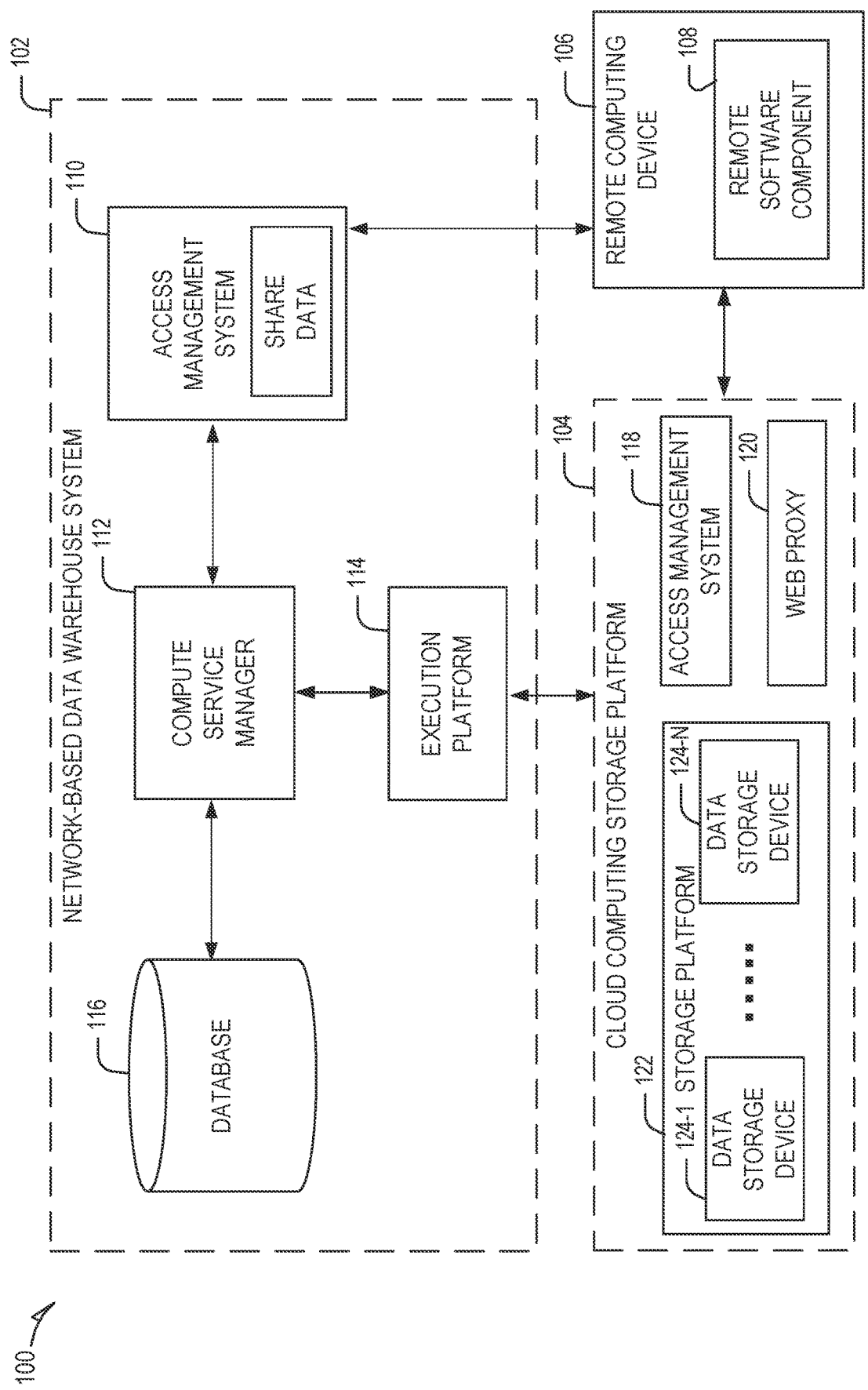
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
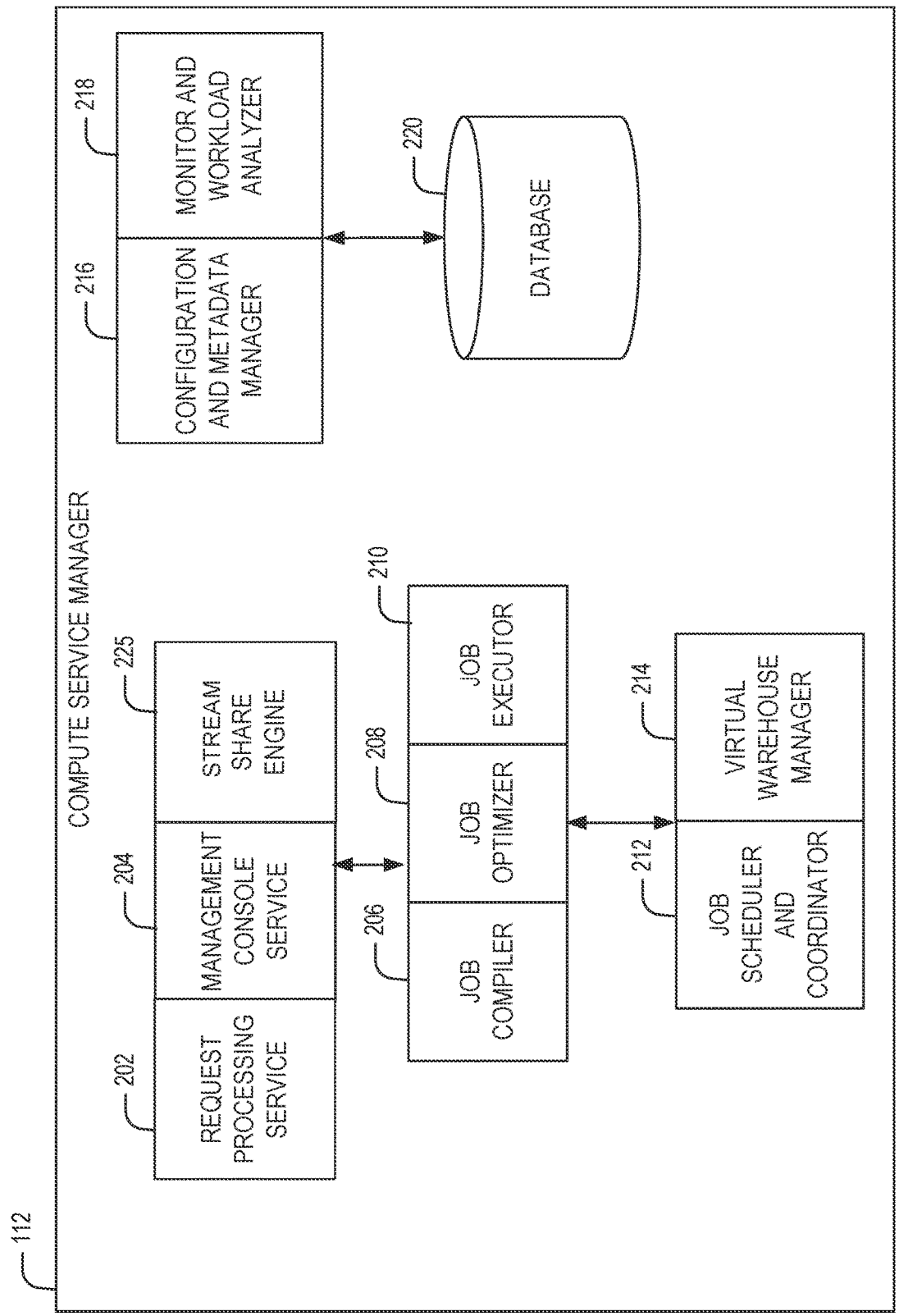
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
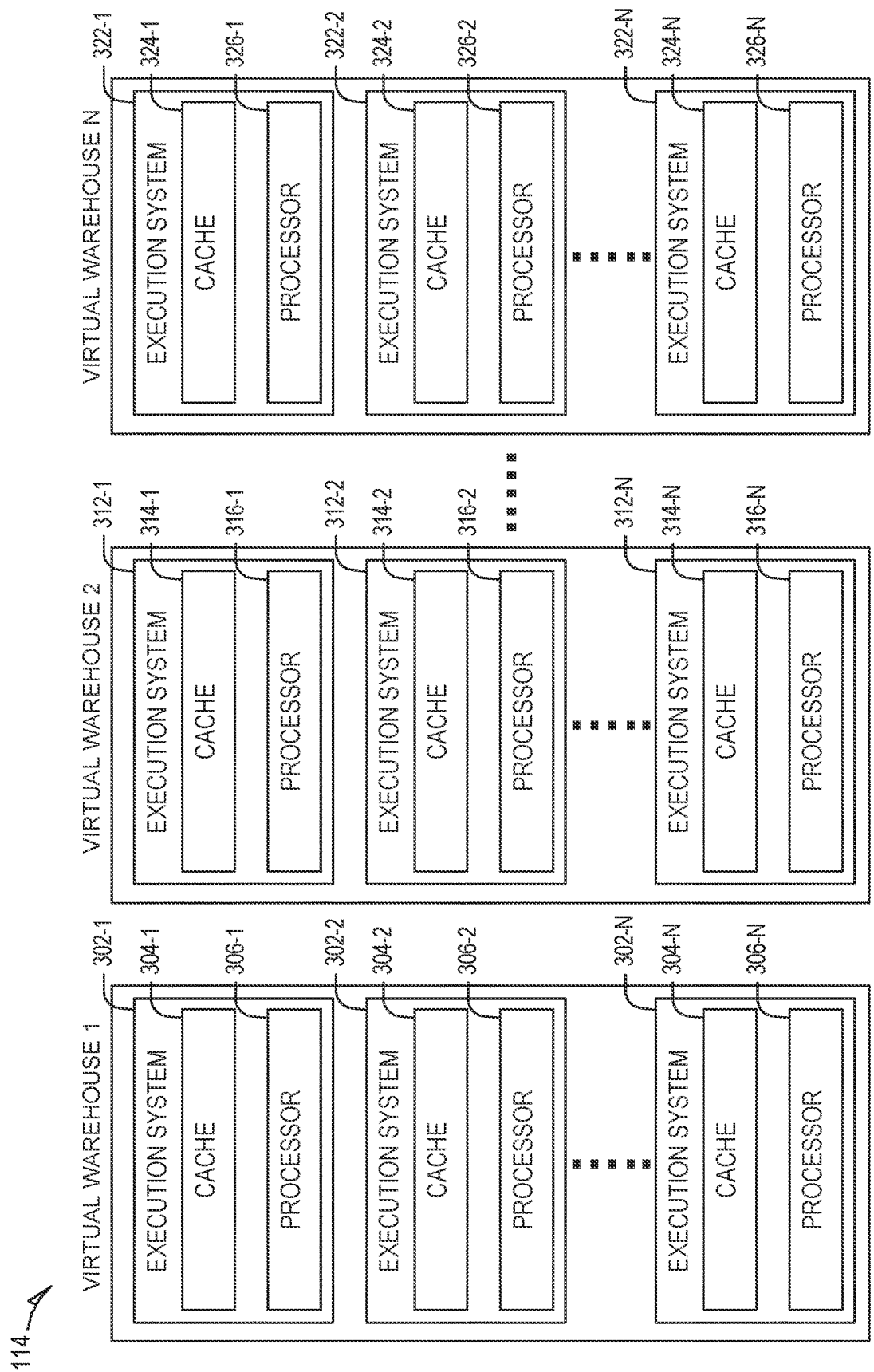
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 duster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large duster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
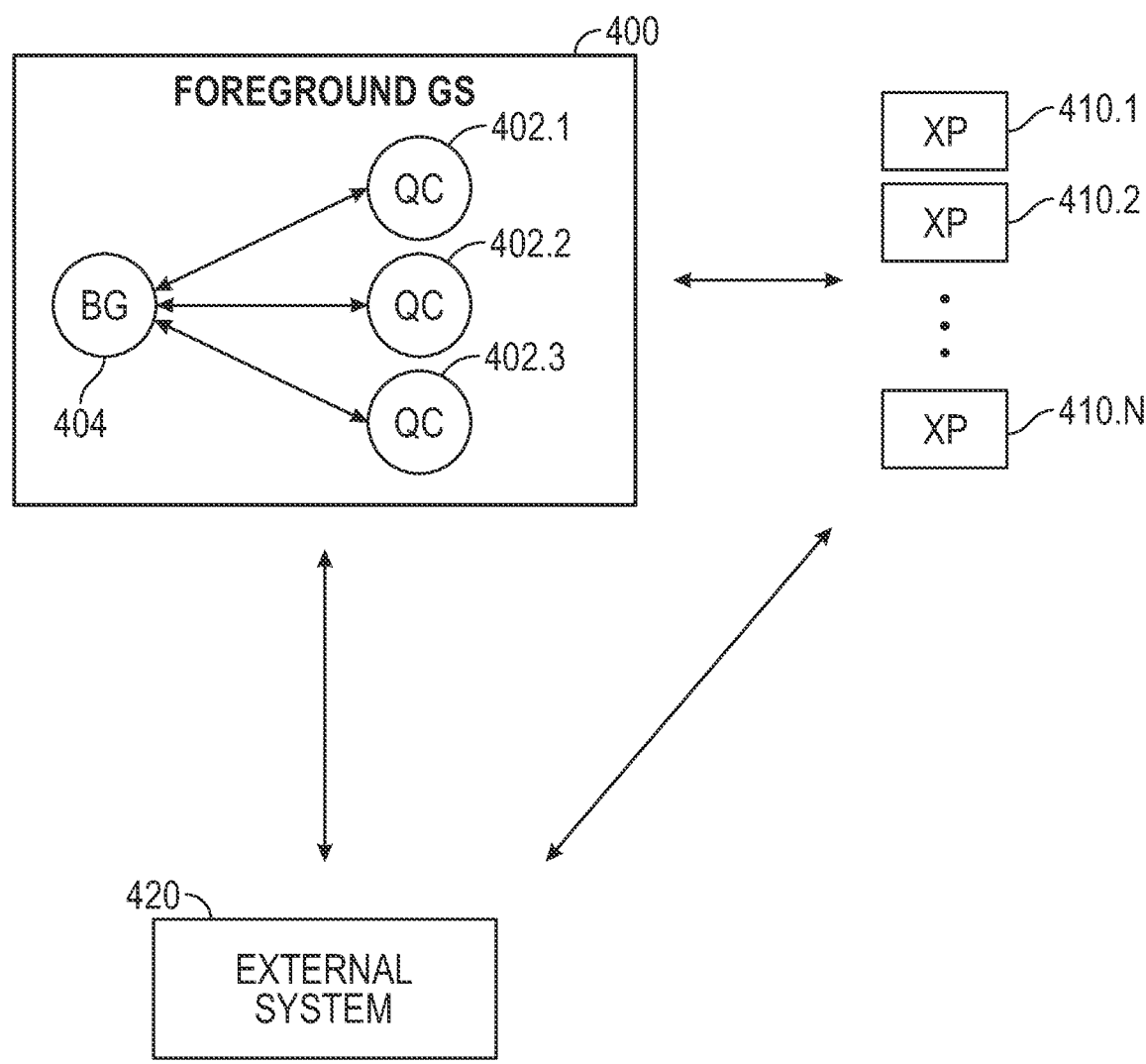
FIG. 4 shows a computing environment, according to some example embodiments.

FIG. 4 shows an example of a computing environment, according to some example embodiments. The computing environment may include a global service (GS) 400, a plurality of nodes (also referred to as XP nodes or execution platforms) 410.1-410.N, and an external system 420. The foreground GS 400 may also be referred to as a compute service manager. The foreground GS 400 may receive query requests and develop query plans to execute the query requests. The foreground GS 400 may broker requests to nodes 410.1-410.N that execute a query plan, as explained in further detail herein. The foreground GS 400 may include query coordinators (QCs) 402.1-402.3, which are coupled to a local background service (BG) 404. In an embodiment, the foreground GS 400 may be defined for a particular type of service, such as copy (replicate), ingest (a type of large table scan), compute, large table scan type queries, etc. The QCs 402.1-402.3 may receive query requests from different sources, which may have different account IDs. For certain operations, such as those involving multiple computing resources working together to execute different portions of an operation (e.g., large table scans), the source may be defined at a data warehouse level granularity. The QCs 402.1-402.3 may communicate information regarding the query requests and their sources to the local BG 404.

As explained in further detail below, the foreground GS 400 may assign nodes to the QC 402.1-402.3. The nodes may be allocated to the foreground GS 400 from a pool of computing nodes 410.1-410.N. Each node 410.1-410.N may include a plurality of workers (also referred to as XP workers or execution workers). For example, each node may include 64 workers. In an embodiment, the workers may be machines, servers, and/or processors. In an embodiment, the workers may be processing cores of a machine. In an embodiment, the workers may include OS threads (e.g., 64 OS threads). Upon receiving its assignment of nodes, the foreground GS, and in particular the QCs 402.1-402.3, may communicate directly with the assigned nodes to execute respective query plans.

The external system 420 may be external to the data warehouse, as described herein. For some queries or portions of some queries, the nodes may need to interact with the external system 420. For example, a query may reference a function associated with the external system 420 (e.g., a remote software component). To engage the external system, the nodes 410.1-410.N may call external functions as described in U.S. Pat. No. 10,628,244, entitled "Calling External Functions From A Data Warehouse," filed on Oct. 29, 2019 and issued on Apr. 21, 2020, which is incorporated herein by reference in its entirety, including but not limited to those portions that specifically appear hereinafter, the incorporation by reference being made with the following exception: In the event that any portion of the above-referenced patent is inconsistent with this application, this application supersedes the above-referenced patent.

Typically, each worker in a node processing the query may transmit one or more external function requests in parallel to the external system 420. For example, if a node includes 64 workers and all workers are processing the query, all 64 workers may be transmitting external function requests to the external system 420. Thus, the request rate for the external system is based on all 64 workers. However, if the external system 420 cannot handle the number of requests sent by the workers, throttling may occur, causing service degradation, network errors (e.g., timeouts), and higher latency.

Figure 5:
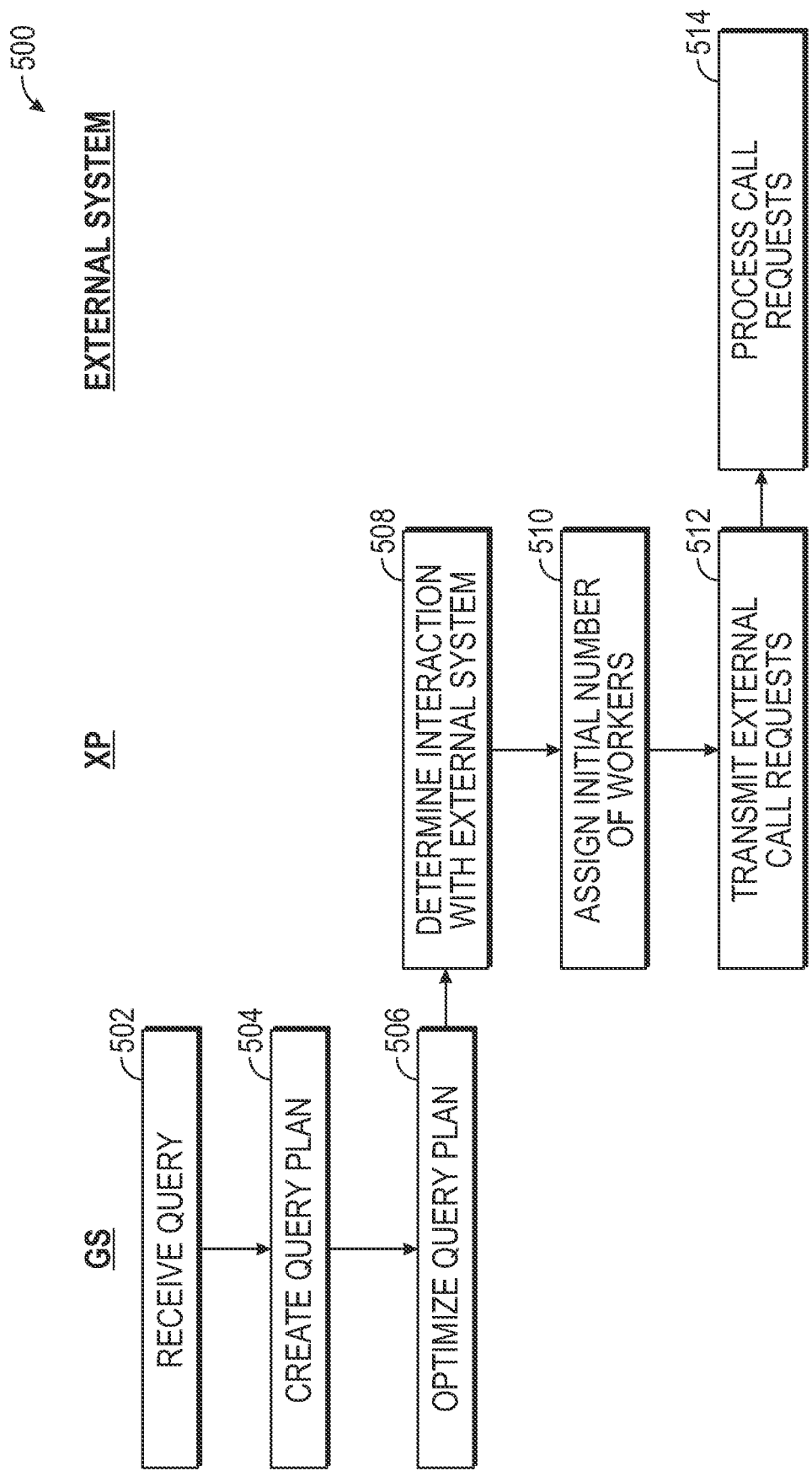
FIG. 5 shows a flow diagram of a method for executing a query, according to some example embodiments.

FIG. 5 shows a flow diagram of a method 500 for executing a query, according to some example embodiments. In an example, portions of the method 500 may be performed by the GS 400, nodes 410.1-410.N, and external system 420. At operation 502, a query may be received by GS 400. The query may include a request for one or more operations to be run on a data set, such as a source table. For example, the query may include a SQL string. At operation 504, in response to receiving the query, a query plan may be created to execute the received query. For example, the SQL string may be parsed. The query plan may include a plurality of operators and links connecting the operators.

At operation 506, the query plan may be revised based on rule-based optimization. That is, the query plan, which for example may be represented as a relational algebra tree, may be revised into a better form based on a set of rules. The rules may be directed to pruning or constant folding one or more operators based on predicate properties, predicate simplification, filter pushdown, eliminating unnecessary grouping or aggregation, and/or other suitable rules. Moreover, as part of optimizing the query, a number of nodes to execute the query plan may be determined. For example, the more complex and larger the query, the more the number of nodes may be used.

At operation 508, the query plan or portions of the query plan may be received by one or more nodes, and each node may determine if the assigned query plan requires interaction with an external system. At 510, the node may assign an initial number of workers to execute the query plan. At 512, each assigned worker may transmit external call requests to the external system based on the query plan. Thus, the initial number of workers may also represent or be proportional to the number of parallel external call requests sent to the external system for processing. The initial number may be set by the node or may be set by the GS. In an embodiment described below, the initial number may be assigned based on communication with the external system, where the external system may alert the data warehouse (e.g., node and/or GS) of the number of parallel requests it can handle at that time. At operation 514, the external system may receive the parallel external call requests and may begin processing those external call requests.

Figure 6:
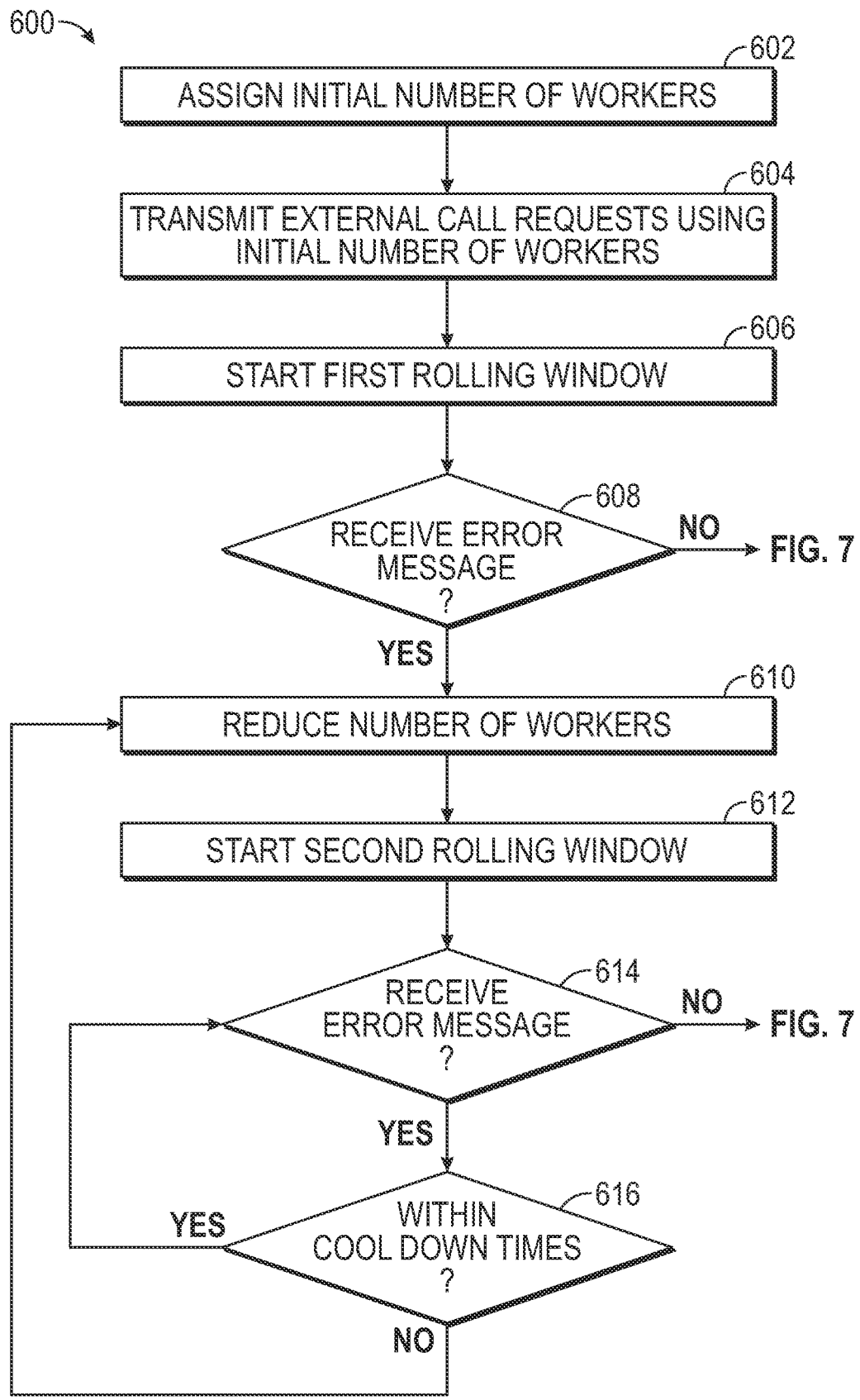
FIG. 6 shows a flow diagram of a method for downscaling a request rate to an external system, according to some example embodiments.

Next, examples of downscaling the number of external call requests is described. FIG. 6 shows a flow diagram of a method 600 for downscaling a request rate to an external system, according to some example embodiments. The method 600 may be executed by a computing node (e.g., node 410.1-410.N). As discussed above with reference to FIG. 5, the node, at operation 602, may assign an initial number of workers to execute a query plan (or portions thereof) that require engaging with an external system.

At operation 604, external call requests may be transmitted to the external system using the set initial number of workers. Hence, the number of workers may represent the request rate because the workers may transmit the requests in parallel. In addition to the multiple workers operating in parallel, each worker may submit multiple external requests to process the operations asynchronously. At operation 606, a first rolling window may be started. The rolling window may be a timer. At operation 608, the node may check if an indication (e.g., an error message) is received during the first rolling window from the external system. For example, the error message may be provided as a HTTP 429 message, indicating that the external system is receiving too many requests. Additionally or alternatively, the error message may be provided as a HTTP 504 message, indicating the external system has timed out. In another embodiment, the error message may be provided as a communication from the external system, requesting a reduction in the request rate.

Figure 7:
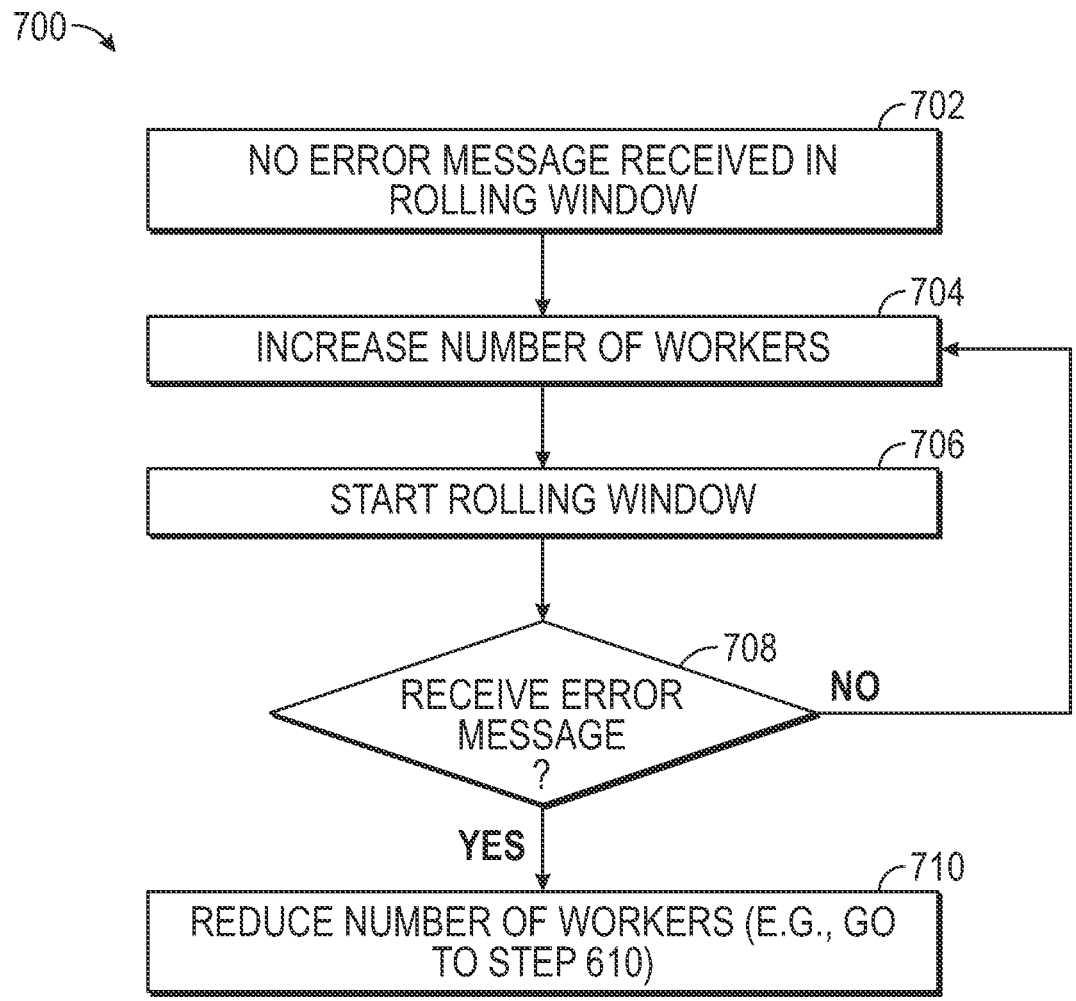
FIG. 7 shows a flow diagram of a method for upscaling a request rate to an external system, according to some example embodiments.

If no error message is received during the first rolling window (e.g., timer has elapsed), the method may increase the request rate as described below with reference to FIG. 7. If, however, an error message is received, the node may reduce the number of internal parallelism used in the asynchronous invocations and also may reduce the number of workers assigned to the query (e.g., second number of workers), thus reducing the request rate to the external system. The reduction in internal parallelism or in the number of workers may be gradual and may be based on an adjustable step size (e.g., 1 worker, 5 workers, etc.). In an embodiment, the node may also consult other nodes before reducing the request rate. For example, if the node determines that other nodes have recently reduced their request rates to the same external system, then the node may not reduce its request rate and start a new rolling window. In another embodiment, the node may transmit information regarding the error message to other nodes and the GS, and the GS may also receive the same type of information from other nodes. Thus, the GS may make the decision on whether to reduce the request rate at particular nodes. Moreover, a lower limit on the number of workers may also be used. That is, the system may not reduce the number of workers below a lower limit. And if the system continues to receive error messages while at the lower limit (with no successes for a defined time), the system may decide to abort the query.

At operation 612, a second rolling window may be started. The rolling window may be a timer. At operation 614, the node may check if an error message is received during the second rolling window from the external system in response to the reduced request rate (e.g., second number of workers). If no error message is received during the second rolling window, the method may increase the request rate as described below with reference to FIG. 7. If, however, an error message is received, the node may check if the error message was received during a cool down time following the reduction of the request rate at operation 616. The cool down time may be a short time period following a reduction in request rate to ensure that any error message received after the reduction is responding to the newly reduced rate and not the previous higher request rate.

If the error message is received during the cool down time, the error message may be ignored, and the request rate may be maintained. If the error message is received after the cool down time, the method 600 may move to operation 610 and may reduce the number of workers again. The method 600 may continue until the query is executed and no more external call requests are being made for the query.

Moreover, any request receiving an error message may be added back to a request queue. Those requests receiving an error message may be prioritized in front of other requests in the request queue.

Next, examples of upscaling the number of external call requests is described. FIG. 7 shows a flow diagram of a method 700 for upscaling a request rate to an external system, according to some example embodiments. At operation 702, it may be determined that no error message was received in a rolling window (as described above with reference to FIG. 6). At operation 704, the number of workers may be increased (e.g., a second number), thus increasing the request rate. At operation 706, another rolling window may be started. The number of increased workers may be gradual and may be based on an adjustable step size (e.g., 1 worker, 5 workers, etc.). Moreover, an upper limit on the number of workers may be used. That is, if the number of workers is at the upper limit, more workers may not be added. The rolling window may be a timer. At operation 708, the node may check if an error message is received during the rolling window from the external system in response to the increased request rate (e.g., second number of workers). If no error message is received during the rolling window, the method may increase the request rate again, returning to operation 704. If an error message is received, the number of workers may be reduced, for example by going to operation 610 of method 600 depicted described above with reference to FIG. 6. The methods 600/700 may continue until the query is executed and no more external call requests are being made for the query.

Figure 8:
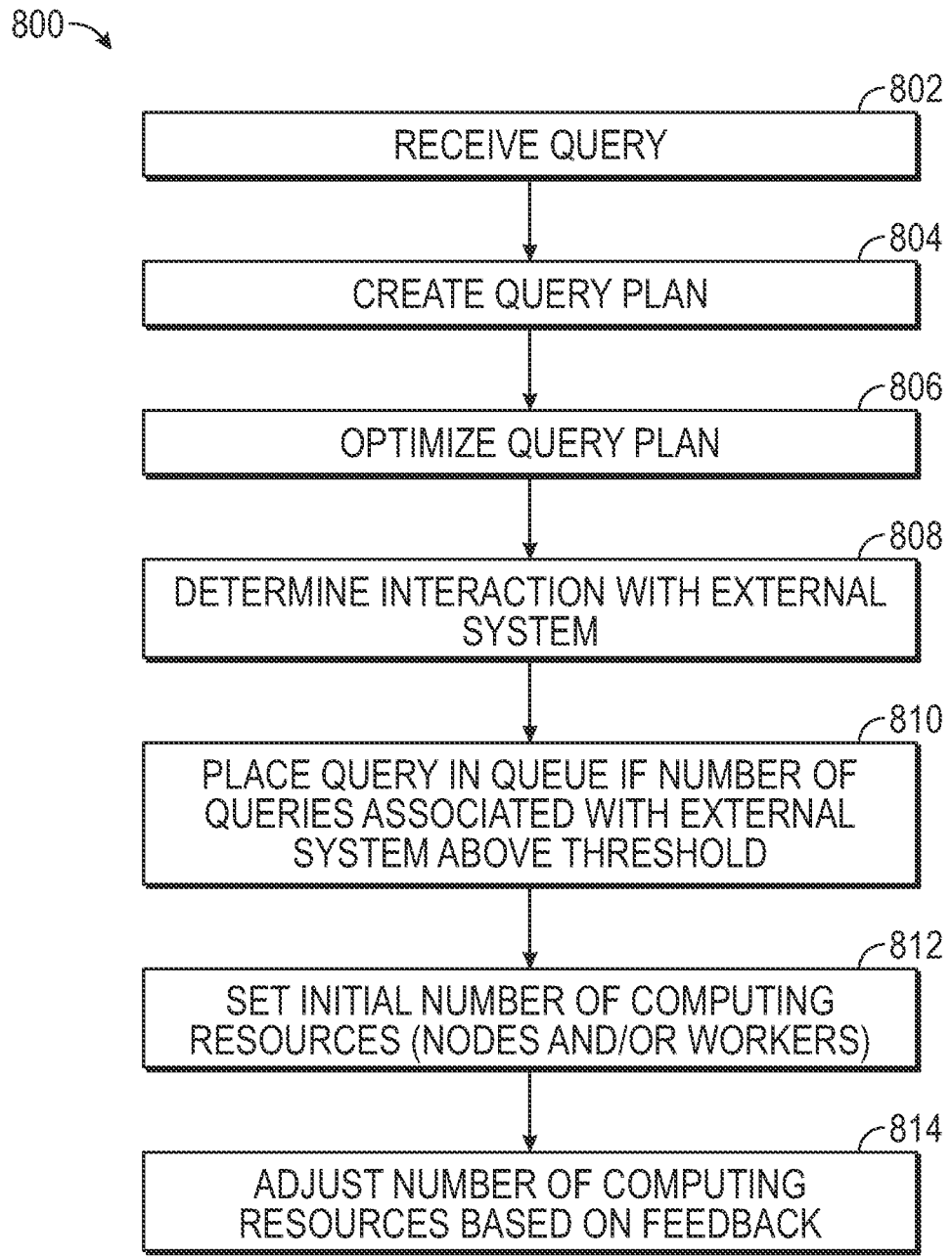
FIG. 8 shows a flow diagram of a global service communicating with an external system, according to some example embodiments.

Some or all of the control of the request rate may be moved to the GS level, too. FIG. 8 is a flow diagram of a GS controlling interaction method 800 with an external system, according to some example embodiments. At operation 802, a query may be received by GS 400. The query may include a request for one or more operations to be run on a data set, such as a source table. For example, the query may include a SQL string. At operation 804, in response to receiving the query, a query plan may be created to execute the received query. For example, the SQL string may be parsed. The query plan may include a plurality of operators and links connecting the operators.

At operation 806, the query plan may be revised based on rule-based optimization. That is, the query plan, which for example may be represented as a relational algebra tree, may be revised into a better form based on a set of rules. The rules may be directed to pruning or constant folding one or more operators based on predicate properties, predicate simplification, filter pushdown, eliminating unnecessary grouping or aggregation, and/or other suitable rules.

At operation 808, the GS may determine that the query requires interaction with an external system. In an embodiment, the GS may communicate with the external system to check the capacity of the external system for handling requests. For example, the GS may ping the external system and, in response, the external system may communicate its current workload, current capacity, future expected workload, future expected capacity, etc. At operation 810, the GS may check how many queries currently require interaction with the external system, and if that number of queries is above a threshold, the GS may place the outstanding query in queue and delay processing it. This may avoid overloading the external system. The threshold may be adjustable and may be set based on communication with the external system regarding its capacity. Moreover, the computing resources (e.g., XP nodes) may also inform the GS about the number of errors they are receiving from the external system. The GS, in turn, may use that information when setting the threshold. In another embodiment, the GS may determine the capacity of the external system based on historical data.

When the query is ready to be processed, the GS, at operation 812, may set an initial number of computing resources for processing the query. As described herein, computing resources may include the number of nodes and/or the number of workers at each node. Furthermore, both the number of nodes and number of workers may be configurable during query processing to adjust the request rate. At operation 814, the GS may adjust the number of computing resources (e.g., number of nodes and/or workers) to modify the request rate to the external system based on feedback from the external system. As described herein, the feedback (e.g., notifications) may be provided in the form of error messages from the external system, expiration of timing windows without receiving an error message, communication with the external system (e.g., out of band-feedback loop), etc. The request rate may be decreased and/or increased during query processing as described herein (e.g., methods described in FIGS. 6 and 7) to optimize the available resources at the external system.

Figure 9:
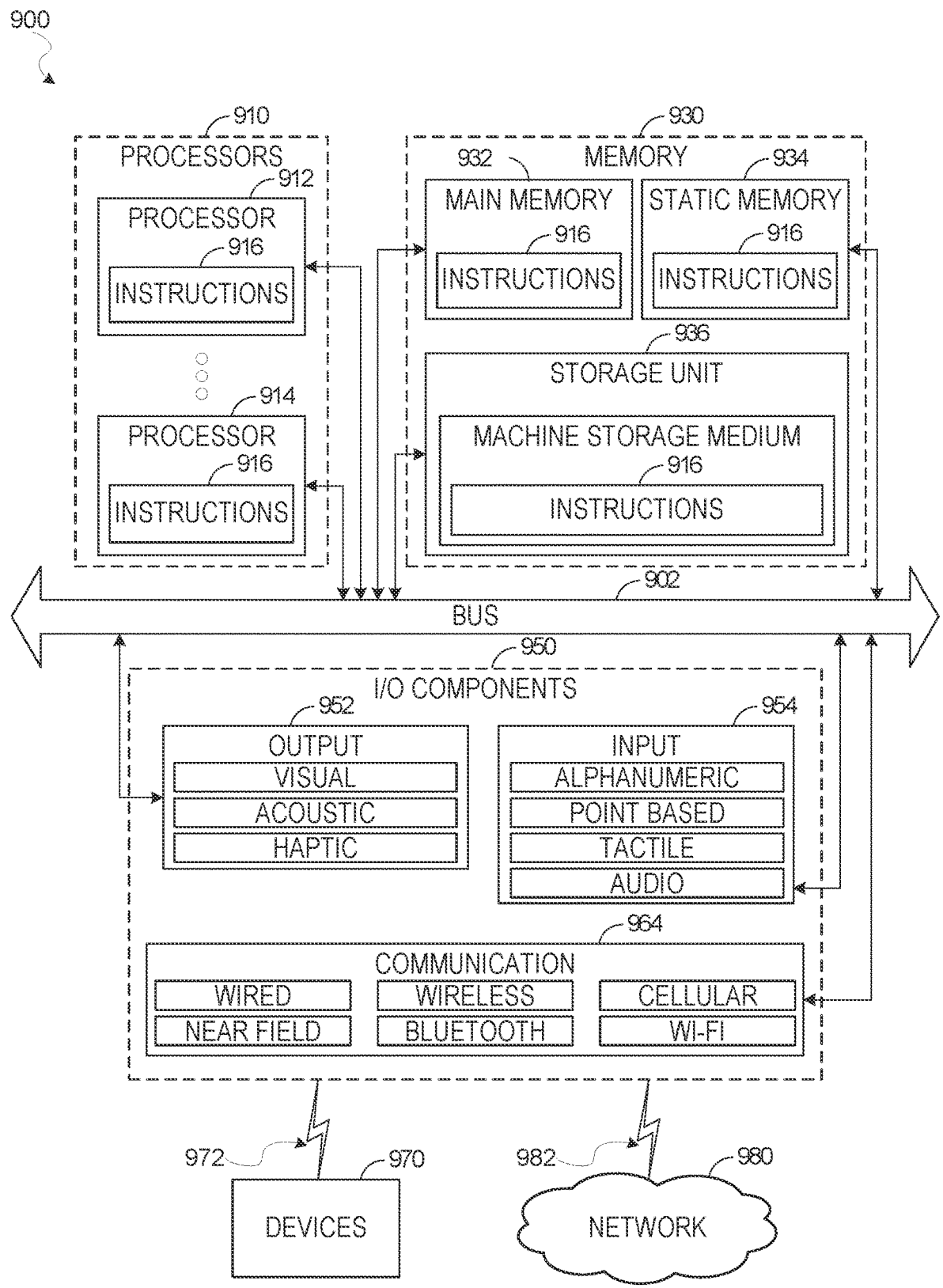
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: receiving, by a processor, a query by a database system; generating a query plan to execute the query; determining that the query plan includes interaction with an external system; setting a first number of parallel computing resources to engage with the external system to execute at least a portion of the query plan including transmitting parallel external call requests to the external system; receiving an indication regarding processing capabilities of the external system with respect to the parallel external call requests; and in response to receiving the indication, modifying the number of parallel computing resources to a second number; executing at least a portion of the query plan using the second number of parallel computing resources; and generating a result of the query.

Example 2. The method of example 1, wherein the indication includes a notification that the external system cannot handle the parallel external call requests from the first number of computing resources, and wherein the second number is less than the first number.

Example 3. The method of any of examples 1-2, wherein the notification includes a HTTP error message received from the external system.

Example 4. The method of any of examples 1-3, further comprising: after modifying the number of parallel computing resources to the second number, receiving a second notification that the external system cannot handle the parallel external call requests, determining whether the second notification is received during a cooling off period following the modifying of the number parallel computing resources to the second number; in response to determining the second notification was received during the cooling off period, maintaining the second number of computing resources; and in response to determining the second notification was received outside of the cooling off period, modifying the number of computing resources to a third number, the third number being less than the second number.

Example 5. The method of any of examples 1-4, wherein the indication includes expiration of a first timing window without receiving a notification that the external system cannot handle the parallel external call requests, and wherein the second number is greater than the first number.

Example 6. The method of any of examples 1-5, further comprising: starting a second timing window after modifying the modifying the number of parallel computing resources to the second number; determining expiration of the second timing window without receiving a notification that the external system cannot handle the parallel call requests from the second number of computing requests; and modifying the number of computing resources to a third number, the third number being greater than the second number.

Example 7. The method of any of examples 1-6, wherein the computing resources are workers of a computing node.

Example 8. The method of any of examples 1-7, wherein the computing resources are computing nodes.

Example 9. The method of any of examples 1-8, further comprising: determining that a number of current queries interacting with the external system is greater than a threshold; and placing the query in a queue to await processing until the number of current queries interacting with the external system falls below the threshold.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
receiving a query by a database system, the query including a request for one or more operations to be performed on a source table, the source table being stored in one or more storage devices within the database system and the one or more storage devices being decoupled from computing nodes of the database system enabling at least one consumer account in the database system to create additional computing resources to process data shared by a provider account in the database system without affecting computing resources of the provider account;
generating, by a compute service manager within the database system, a query plan to execute the query;
revising, by the compute service manager, the query plan based on a set of optimization rules to generate a revised query plan;
determining a number of computing nodes within the database system to execute the query based on the revised query plan;
receiving, at the number of computing nodes, at least a portion of the revised query plan;
assigning, by a first node of the number of computing nodes, a first number of worker devices to execute the at least portion of the revised query plan, the worker devices being internal to the database system;
transmitting, by the first number of worker devices, a first set of external call requests in parallel to an external system outside of the database system, processing capabilities of the external system being unknown to the database system when the external call requests are transmitted;
receiving, by the database system, an indication regarding processing capabilities of the external system with respect to the first set of external call requests, wherein the indication includes a notification that the external system cannot handle the first set of external call requests in parallel from the first number of worker devices;
in response to receiving the indication, modifying the number of worker devices to a second number, the second number being less than the first number;
executing at least the portion of the revised query plan using the second number of worker devices by transmitting a second set of external call requests in parallel to the external system and receiving responses from the external system in response to the second set of external call requests;
after modifying the number of worker devices to the second number, receiving a second notification that the external system cannot handle the external call requests;
determining whether the second notification is received during a cooling off period following the modifying of the number of worker devices to the second number;
in response to determining the second notification was received during the cooling off period, maintaining the second number of worker devices;

in response to determining the second notification was received outside of the cooling off period, modifying the number of worker devices to a third number, the third number being less than the second number; and
generating a result of the query, the result incorporating the responses received from the external system.

2. The method of claim 1, wherein the notification includes a HTTP error message received from the external system.

3. The method of claim 1, wherein the worker devices are threads of respective computing nodes.

4. The method of claim 1, wherein the worker devices are processors of respective computing nodes.

5. The method of claim 1, further comprising:
determining that a number of current queries interacting with the external system is greater than a threshold; and
placing the query in a queue to await processing until the number of current queries interacting with the external system falls below the threshold.

6. The method of claim 1, further comprising:
determining that the query comprises a reference associated with the external system.

7. The method of claim 1, wherein the set of optimization rules includes pruning.

8. The method of claim 1, wherein the set of optimization rules includes constant folding of one or more operators based on predicate properties.

9. The method of claim 1, wherein the set of optimization rules includes filter pushdown.

10. A machine-storage medium embodying instructions that, when executed by a machine, cause the machine to perform operations comprising:
receiving a query by a database system, the query including a request for one or more operations to be performed on a source table, the source table being stored in one or more storage devices within the database system and the one or more storage devices being decoupled from computing nodes of the database system enabling at least one consumer account in the database system to create additional computing resources to process data shared by a provider account in the database system without affecting computing resources of the provider account;
generating, by a compute service manager within the database system, a query plan to execute the query;
revising, by the compute service manager, the query plan based on a set of optimization rules to generate a revised query plan;
determining a number of computing nodes within the database system to execute the query based on the revised query plan;
receiving, at the number of computing nodes, at least a portion of the revised query plan;
assigning, by a first node of the number of computing nodes, a first number of worker devices to execute the at least portion of the revised query plan, the worker devices being internal to the database system;
transmitting, by the first number of worker devices, external call requests to an external system outside of the database system, processing capabilities of the external system being unknown to the database system when the external call requests are transmitted;
receiving, by the database system, an indication regarding processing capabilities of the external system with respect to the first set of external call requests, wherein the indication includes a notification that the external system cannot handle the first set of external call requests in parallel from the first number of worker devices;
in response to receiving the indication, modifying the number of worker devices to a second number, the second number being less than the first number;
executing at least the portion of the revised query plan using the second number of worker devices by transmitting a second set of external call requests in parallel to the external system and receiving responses from the external system in response to the second set of external call requests;
after modifying the number of worker devices to the second number, receiving a second notification that the external system cannot handle the external call requests;
determining whether the second notification is received during a cooling off period following the modifying of the number of worker devices to the second number;
in response to determining the second notification was received during the cooling off period, maintaining the second number of worker devices;
in response to determining the second notification was received outside of the cooling off period, modifying the number of worker devices to a third number, the third number being less than the second number; and
generating a result of the query, the result incorporating the responses received from the external system.

11. The machine-storage medium of claim 10, wherein the notification includes a HTTP error message received from the external system.

12. The machine-storage medium of claim 10, wherein the worker devices are threads of respective computing nodes.

13. The machine-storage medium of claim 10, wherein the worker devices are processors of respective computing nodes.

14. The machine-storage medium of claim 10, further comprising:
determining that a number of current queries interacting with the external system is greater than a threshold; and
placing the query in a queue to await processing until the number of current queries interacting with the external system falls below the threshold.

15. The machine-storage medium of claim 10, further comprising:
determining that the query comprises a reference associated with the external system.

16. The machine-storage medium of claim 10, wherein the set of optimization rules includes pruning.

17. The machine-storage medium of claim 10, wherein the set of optimization rules includes constant folding of one or more operators based on predicate properties.

18. The machine-storage medium of claim 10, wherein the set of optimization rules includes filter pushdown.

19. A system comprising:
one or more processors of a machine; and
a memory storing instructions that, when executed by the one or more processors, cause the machine to perform operations comprising:
receiving a query by a database system, the query including a request for one or more operations to be performed on a source table, the source table being stored in one or more storage devices within the database system and the one or more storage devices being decoupled from computing nodes of the database system enabling at least one consumer account in the database system to create additional computing resources to process data shared by a provider account in the database system without affecting computing resources of the provider account;

generating, by a compute service manager within the database system, a query plan to execute the query;

revising, by the compute service manager, the query plan based on a set of optimization rules to generate a revised query plan;

determining a number of computing nodes within the database system to execute the query based on the revised query plan;

receiving, at the number of computing nodes, at least a portion of the revised query plan;

assigning, by a first node of the number of computing nodes, a first number of worker devices to execute the at least portion of the revised query plan, the worker devices being internal to the database system;

transmitting, by the first number of worker devices, external call requests to an external system outside of the database system, processing capabilities of the external system being unknown to the database system when the external call requests are transmitted;

receiving, by the database system, an indication regarding processing capabilities of the external system with respect to the first set of external call requests, wherein the indication includes a notification that the external system cannot handle the first set of external call requests in parallel from the first number of worker devices;

in response to receiving the indication, modifying the number of worker devices to a second number, the second number being less than the first number;

executing at least the portion of the revised query plan using the second number of worker devices by transmitting a second set of external call requests in parallel to the external system and receiving responses from the external system in response to the second set of external call requests;

after modifying the number of worker devices to the second number, receiving a second notification that the external system cannot handle the external call requests;

determining whether the second notification is received during a cooling off period following the modifying of the number of worker devices to the second number;

in response to determining the second notification was received during the cooling off period, maintaining the second number of worker devices;

in response to determining the second notification was received outside of the cooling off period, modifying the number of worker devices to a third number, the third number being less than the second number; and generating a result of the query, the result incorporating the responses received from the external system.

20. The system of claim 19, wherein the notification includes a HTTP error message received from the external system.

21. The system of claim 19, wherein the worker devices are threads of respective computing nodes.

22. The system of claim 19, wherein the worker devices are processors of respective computing nodes.

23. The system of claim 19, the operations further comprising:
determining that a number of current queries interacting with the external system is greater than a threshold; and
placing the query in a queue to await processing until the number of current queries interacting with the external system falls below the threshold.

24. The system of claim 19, the operations further comprising:
determining that the query comprises a reference associated with the external system.

25. The system of claim 19, wherein the set of optimization rules includes pruning.

26. The system of claim 19, wherein the set of optimization rules includes constant folding of one or more operators based on predicate properties.

27. The system of claim 19, wherein the set of optimization rules includes filter pushdown.

* * * * *